(12) United States Patent
Southworth et al.

(10) Patent No.: US 10,812,402 B2
(45) Date of Patent: Oct. 20, 2020

(54) SHAPING OF POST-SCHEDULING NETWORK PIPELINE JITTER

(71) Applicant: INTEL CORPORATION, Santa Clara, CA (US)

(72) Inventors: Robert Southworth, Chatsworth, CA (US); Ben-Zion Friedman, Jerusalem (IL); Robert Munoz, Round Rock, TX (US); Sarig Livne, Misgav (IL); Chih-Jen Chang, Union City, CA (US); Yue Yang, Santa Clara, CA (US); Partick Fleming, Slatt Wolfhill (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,127

(22) Filed: Dec. 28, 2018

(65) Prior Publication Data
US 2019/0140964 A1    May 9, 2019

(51) Int. Cl.
| | |
|---|---|
| *H04L 12/841* | (2013.01) |
| *H04L 12/26* | (2006.01) |
| *H04L 12/927* | (2013.01) |
| *H04L 12/819* | (2013.01) |
| *H04L 12/815* | (2013.01) |
| *H04L 12/813* | (2013.01) |
| *H04J 3/06* | (2006.01) |

(52) U.S. Cl.
CPC .......... *H04L 47/283* (2013.01); *H04J 3/0635* (2013.01); *H04L 43/087* (2013.01); *H04L 43/0888* (2013.01); *H04L 43/106* (2013.01); *H04L 47/20* (2013.01); *H04L 47/215* (2013.01); *H04L 47/22* (2013.01); *H04L 47/805* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 7,729,387 B2 | 6/2010 | Beck et al. | |
| 2011/0128885 A1* | 6/2011 | Breslin | H04L 43/028 370/253 |

* cited by examiner

*Primary Examiner* — Peter Chen
(74) *Attorney, Agent, or Firm* — Schwabe, Williamson & Wyatt, P.C.

(57) ABSTRACT

Apparatuses and methods for managing jitter resulting from processing through a network interface pipeline are disclosed. In embodiments, a network traffic scheduler annotates packets to be transmitted over a bandwidth-limited network connection with time relationship information to ensure downstream bandwidth limitations are not violated. Following processing through a network interface pipeline, a jitter shaper inspects the annotated time relationship information and pipeline-imposed delays and, by imposing a variable delay, reestablishes bandwidth-complaint time relationships based upon the annotated time relationship information and configured tolerances.

21 Claims, 10 Drawing Sheets

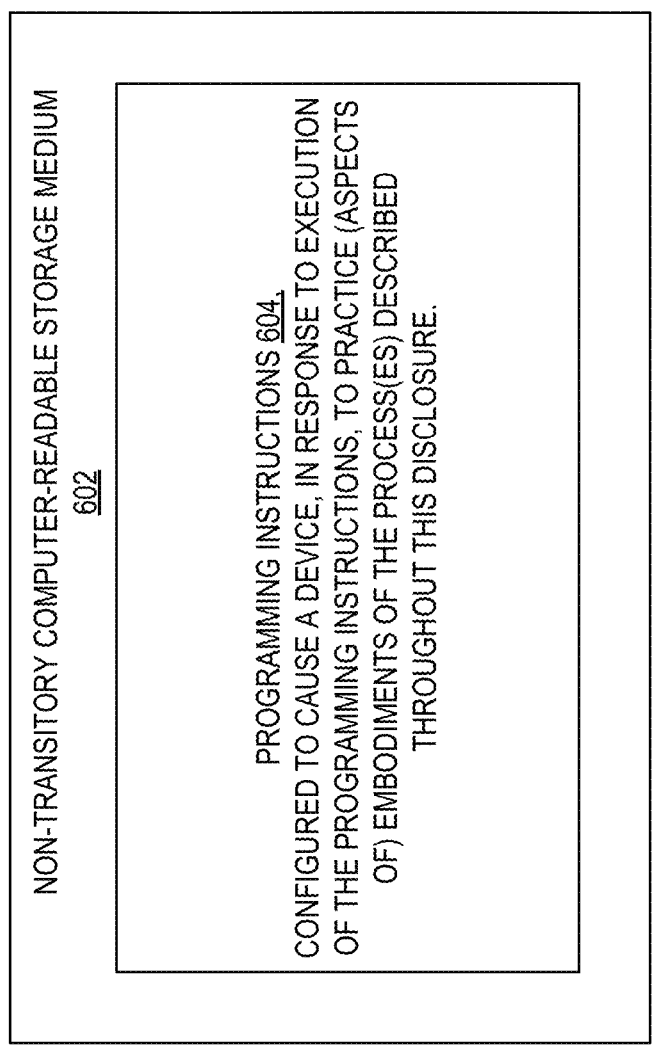

SHAPING OF POST-SCHEDULING NETWORK PIPELINE JITTER

TECHNICAL FIELD

Embodiments described herein generally relate to the field of networking. Specifically, apparatuses and methods for controlling, shaping, and reshaping packet traffic to manage burstiness, referred to as "jitter shaping", are described.

BACKGROUND

Network interfaces, such as a network interface card or apparatus for communicating on a network, handle preparation of data to be transmitted from a device across the network. Network technologies may include wired networks, such as Ethernet or an optical network, or wireless networks, such as WiFi or cellular networks. One or more network interfaces are found in many electronics devices available today, including computers, smartphones, and tablets, networking equipment including routers, bridges, access points, and so forth, and, increasingly, in internet-of-things (IoT) devices, such as consumer devices like various household appliances.

BRIEF DESCRIPTION OF THE DRAWINGS

FIG. 6 is a block diagram of a computer-readable storage medium that can be used to implement some of the components of the system or methods disclosed herein, according to various embodiments.

DESCRIPTION OF EMBODIMENTS

Figure 1:
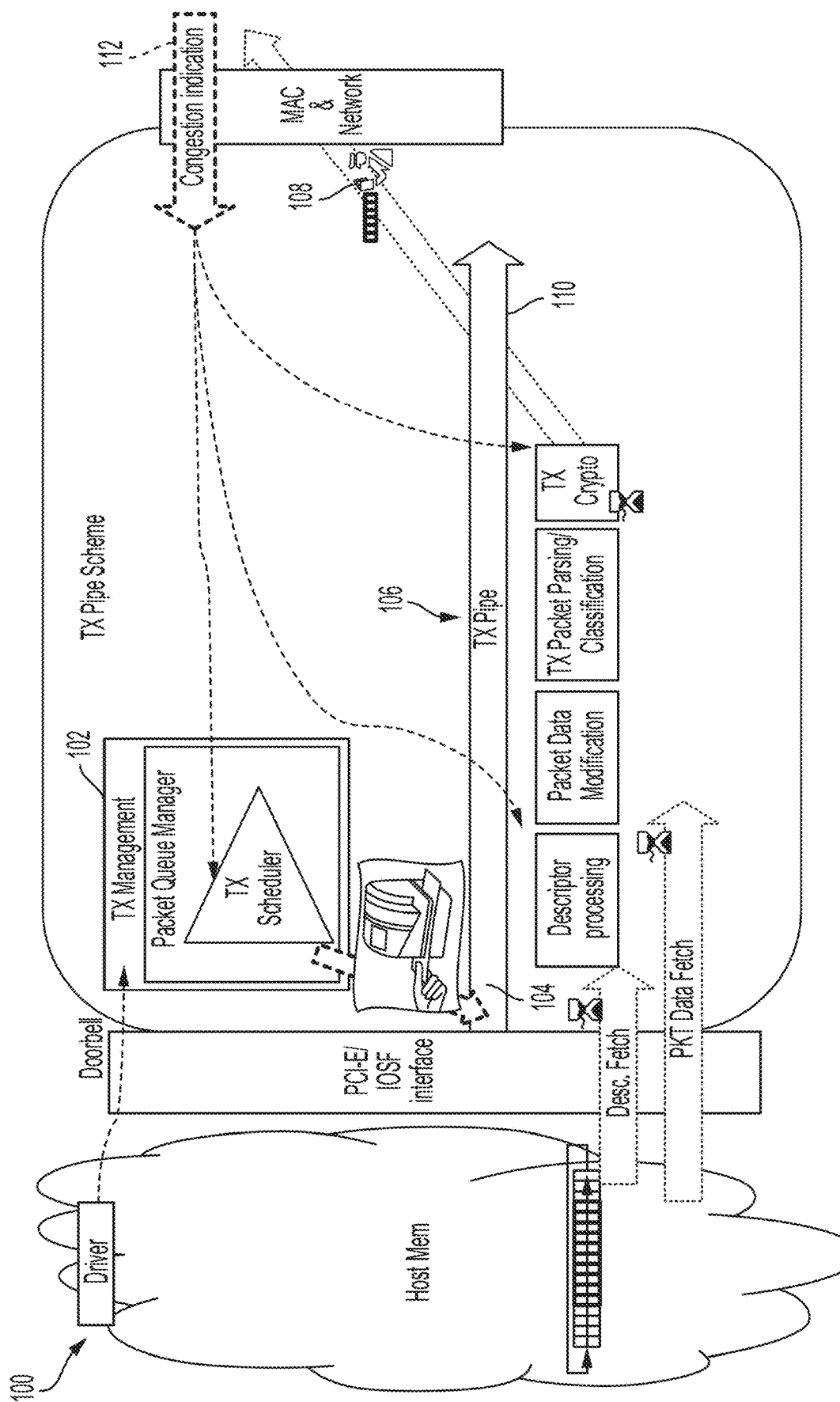
FIG. 1 illustrates an example apparatus for shaping of jitter induced in a network pipeline, according to various embodiments.

In a networked environment, downstream receivers of network traffic may impose limitations, such as bandwidth and input burstiness constraints, which may include limits on the number of packets and/or amount of data that can be received in a given timeframe. Exceeding these limits may result in further throttling of traffic or, in some cases, discarding of packets once limits are reached. Discarded traffic may necessitate retransmission, wasting resources and bandwidth, in addition to causing adverse effects on underlying applications generating or receiving traffic, such as dropouts in audio or video, session timeouts, or other undesirable results. To avoid exceeding limitations, networking systems and/or network interface controllers (NICs) may be configured to shape output traffic in accordance with one or more output rates and burst tolerances (e.g. peak and sustained rates and burst tolerances) as well as optionally receive feedback from internal buffer memory utilization indications and/or downstream receivers.

A sophisticated controller can be employed in the networking system and/or NIC to precisely control traffic output. The controller can manage bandwidth by establishing time relationships for packets to be transmitted, to smooth out traffic bursts and provide a more consistent traffic flow. Relevant to the embodiments disclosed herein, the sophisticated controller is typically placed at or before the start of the NIC processing pipeline. Consequently, the original time relationships the controller specifies can be impaired (jittered) in the subsequent output processing pipeline, such as in cases where non-trivial additional NIC post-processing is required such as substantial packet modifications. Furthermore, it is typically not feasible to implement the sophisticated controller after the portion of processing which is causing the impairments/jitter, as such an implementation can require adding resources to the NIC that are not practical.

In the disclosed embodiments, the environment is a networking interface subsystem (connected to a central processing unit (CPU) subsystem via a peripheral component interface express (PCIe) or similar on or off-die bus interface) to support wireless infrastructure and other communications markets. The sophisticated controller is an egress traffic manager that controls complex policy-driven hierarchical scheduling and shaping of output packets transmitted out of a collection of Ethernet network interfaces. The NIC in the disclosed embodiments includes inline cryptographic and other processing within the NIC processing pipeline for which latency can be highly variable. Buffer memory and interface bandwidth to and from the CPU subsystem can be expensive resources, as in some implementations the network interface subsystem will be on a separate, potentially cost-sensitive, PCIe card where it may be impractical for cost, board area, etc., reasons to provide external direct attached memory. In some implementations, the scheduler contained in the egress traffic manager needs to carefully manage buffer memory consumption and CPU subsystem interface bandwidth by only transferring the associated packet data to transmit from the CPU subsystem a single time and by minimizing the required transient latency and associated additional buffer memory usage. Disclosed embodiments allow the reduction and management of the amount of additional post-scheduling/shaping burstiness/jitter introduced to prevent unacceptable packet policing violations at downstream network devices while reducing the need to introduce additional latency and associated buffering.

Disclosed embodiments solve the jitter problem by having the sophisticated controller annotate the output with information about the original time relationships (e.g., via timestamps in associated packet metadata) so that a relatively simple second controller at the end of the output pipeline can read and use this information. The second controller uses the supplied annotations together with information about allowable error tolerance (for example, a maximum allowable difference between emission intervals and a configurable reconciliation rate, described herein) to approximately recreate the original time relationships originally specified by the sophisticated controller. It does so in a manner that minimizes additional latency and the associated need for potentially expensive intermediate buffering resources.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an apparatus 100 for networking, which, in the disclosed embodiments, includes a sophisticated network traffic scheduler 102 communicatively coupled to a start 104 of a network interface pipeline 106, and a jitter shaper 108 communicatively coupled to an end 110 of the network interface pipeline 106. In embodiments, the network traffic scheduler 102 annotates each of a plurality of network packets to be processed through the network interface pipeline 106 with time relationship information, the time relationship information calculated with respect to network bandwidth limitations. The jitter shaper 108 sets a time spacing of the plurality of network packets for transmission at least partially according to the time relationship information annotated by scheduler 102.

Apparatus 100 may be implemented, in whole or in part, as a stand-alone network interface card, such as a PCIe card that can be inserted into a computer device 500 (such as a desktop or server), or may be integrated into one or more components of computer device 500, such as where computer device 500 is implemented as a laptop or portable device, such as a smartphone or tablet. In other implementations, apparatus 100 may be embedded in a system-on-chip, with a hardware accelerator, or as an application specific integrated circuit (ASIC). In various implementations, apparatus 100 may feed into a wireless transceiver, a wired transceiver, or both. The transceiver (which may be discrete transmitter and receiver units, or an integrated transceiver) may support wired protocols of various suitable types, such as Ethernet or a fiber optic interface. Additionally or alternatively, the transceiver may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks.

Network traffic scheduler 102 is responsible, in the disclosed embodiments, for receiving data from CPU and memory subsystems (not shown) and determining how to space the traffic, in a time domain, to ensure that any bandwidth and/or burst limitations (referred to simply as "bandwidth limitations" herein) imposed by downstream receivers of the traffic are not violated. Such limitations may be part of meeting overall quality of service (QoS) scheduling/shaping objectives. As will be discussed with respect to FIG. 2, described below, scheduler 102 ensures bandwidth and burst limitations are not violated by tagging packets with time relationship information. To carry out this function, scheduler 102 may optionally be configured with per node information about the hierarchy shaping/scheduling, burst tolerance policy information, and may receive feedback 112, in some examples, from internal buffer memory utilization indications and/or downstream network devices. This feedback may include various indicators, such as bandwidth utilization, buffer status, packets received within a recent predetermined time period, number or amount of packets that may be received within a time period without discarding, and/or any other metrics useable by scheduler 102 to determine an appropriate time relationship between network packets that ensures downstream limits are not exceeded.

In some embodiments, network traffic scheduler 102 receives such feedback 112 as incoming network traffic or internal utilization signals into apparatus 100. Other embodiments may omit or otherwise not require feedback 112, and instead configure scheduler 102 with known bandwidth limitations, relying upon scheduler 102 to establish a packet timing that stays within the limits. Still other embodiments may receive bandwidth or other utilization information by different channels, such as other network interface cards. In some embodiments, scheduler 102 is also constrained by consumption of available buffer memory, as well as CPU subsystem interface bandwidth.

Network traffic scheduler 102 interfaces with the start 104 of network interface pipeline 106. This is a logical association; depending upon the particulars of a given embodiment, scheduler 102 may directly feed packets into a first module or processing node of pipeline 106, or may simply set scheduling of packets prior to each packet entering the start of pipeline 106, such as where the various packets are located in a buffer or similar memory location. Following scheduling in such implementations, the start or first node of pipeline 106 may retrieve each packet in scheduled order from the buffer. Network traffic scheduler 102, in various possible implementations, may tag packets directly within a buffer for pipeline 106, may tag packets from a separate buffer, possibly dedicated to scheduler 102, and copy or move them to a buffer for pipeline 106, may receive packets directly from a driver or other subsystem of computer device 500, tag and then place into a buffer for pipeline 106, or may employ any other suitable technique for scheduler 102 to annotate or otherwise set the time relationship of each packet prior to processing by pipeline 106.

Network interface pipeline 106, in embodiments, includes one or more modules or nodes for processing packets received from various subsystems of computer device 500 for transmission over a network interface. Possible example nodes are depicted in FIG. 1, and may include such functions as descriptor processing, packet data modification, transmission packet parsing/classification, and transmission cryptography. As will be understood, other nodes may be employed depending upon the requirements of a given implementation of apparatus 100. The order of a given set of nodes likewise may vary depending on the requirements of a given implementation.

Each of the various nodes may impose a degree of delay or latency due to factors such as processing overhead. Further, the imposed delay or latency may vary on a packet to packet basis. For example, a compression or cryptographic node may vary in the amount of time required to process a given packet depending upon the size and nature of data in the packet as well as selected compression or cryptographic algorithm. Relatively simple data, such as image data that may have large blocks of repeating symbols, may be quickly processed, while complex data, such as an executable file, may require a greater time and/or more complex processing to encrypt or compress. These differing processing times can distort the time relationship initially imposed by network traffic scheduler 102, which is seen as timing jitter at pipeline end 110. As a result, careful timing of packets to ensure downstream bandwidth limitations are met may be disrupted, potentially resulting in periodic bursts of packets that exceed bandwidth limits that would otherwise pass without issue if spaced as originally intended by scheduler 102.

Jitter shaper 108 is communicatively coupled to the end 110 of network interface pipeline 106, in the embodiment depicted in FIG. 1, and so is typically one of the final stages network packets pass through before being handed off to a MAC and/or physical layer for network transmission. Jitter shaper 108, as will be discussed in greater detail herein with respect to FIG. 2, recreates the original packet timing established by the network traffic scheduler 102 that may have been disrupted by the pipeline 106. This is typically accomplished by delaying release of a network packet for network transmission a predetermined (which may be calculated) time after its immediate predecessor packet is transmitted. The predetermined/calculated time is determined at least by reference to the time relationship information annotated to each packet by network traffic scheduler 102, as will be discussed herein.

Jitter shaper 108 is, in embodiments, comparatively simple in architecture as compared to network traffic scheduler 102. As jitter shaper 108 need only delay a given packet until an appropriate amount of time elapses since a previous packet is transmitted, jitter shaper 108 typically has comparatively low buffer memory requirements compared to scheduler 102, as well as reduced processing requirements. Such an arrangement can help keep the cost of apparatus 100 to a minimum, while still providing compliance with downstream bandwidth and burstiness requirements.

Components of apparatus 100, including network traffic scheduler 102, one or more nodes of network interface pipeline 106, and/or jitter shaper 108, in embodiments, include or is implemented using, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA), which may be customized for use by apparatus 100. In some embodiments, one or more components of apparatus 100 may be implemented in software, using computer readable media, which is executable by one of the foregoing processors. In other embodiments, a combination of hardware and software may be used to implement one or more components of apparatus 100.

In some specific non-limiting examples, apparatus 100 may include a MAC and/or physical layer, for interfacing with a network, that may comport with the Institute of Electrical and Electronics Engineers (IEEE) 802.3 series of standards (e.g. Ethernet), 802.11 series of standards (e.g., Wi-Fi), a Bluetooth®, ZigBee®, near-field communication, or any other suitable wireline or wireless communication standard. In addition, apparatus 100 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

Figure 2:
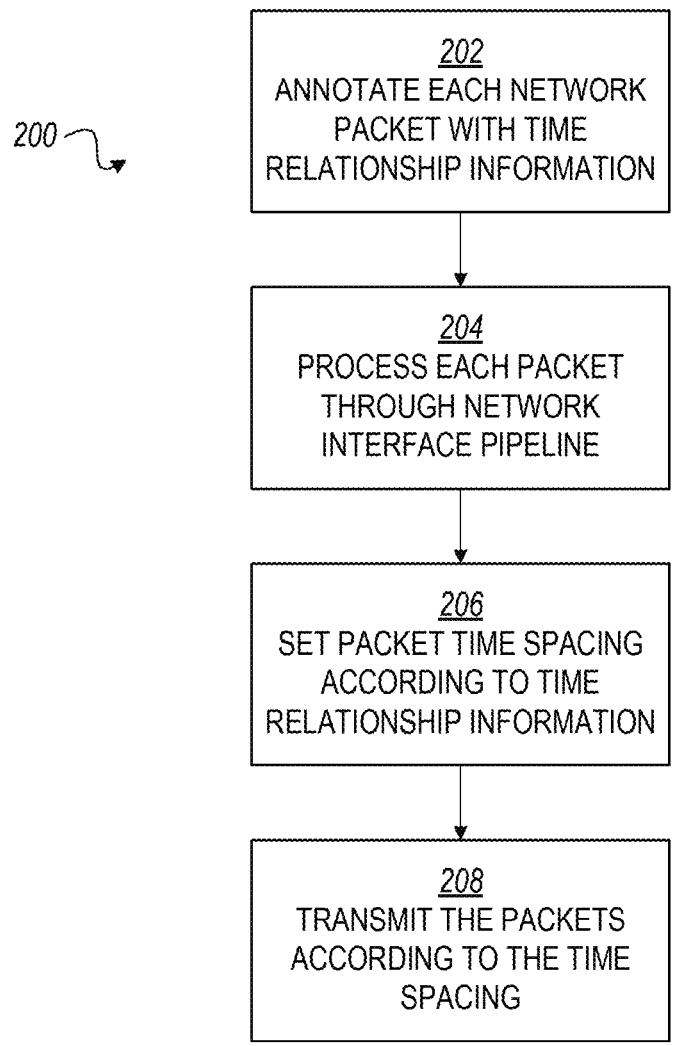
FIG. 2 is a flowchart of an example method for shaping of jitter induced in a network pipeline that may be executed by the apparatus of FIG. 1, according to various embodiments.

FIG. 2 depicts the operations of an example method 200 for jitter management that may be carried out in whole or in part by an apparatus 100. In various embodiments, the operations may be performed by the earlier described network traffic scheduler 102 and jitter shaper 108. Starting in operation 202, each network packet for network transmission is annotated, e.g. by network traffic scheduler 102, with time relationship information. The time relationship information is determined, e.g. by network traffic scheduler 102, with reference to downstream network conditions and limitations, as mentioned above. In embodiments, each packet is annotated with a time stamp and/or a time duration indicating the relative time delay between transmission of a given packet and its immediate successor. This information may be associated with each packet by way of a field, metadata, or tag appended to each packet. Other embodiments may convey associated time relationship information in a different, suitable fashion. In some embodiments, the tag or annotation is a time stamp or counter (collectively, time stamp) that automatically increments in a consistent time duration. The time stamp of a network packet can be subtracted from the timestamp of its immediate successor to determine a time difference. This time difference equals the delay in transmission of the immediate successor from the initially set time stamp. In some embodiments, this difference information may be directly annotated to each packet, rather than a complete time stamp. The complete time stamp may only need to be annotated on an initial or occasional basis, or may not need to be annotated, such as in embodiments where scheduler 102 annotates each packet, as discussed above, and scheduler 102 and jitter shaper 108 share a clock or have synchronized clocks.

Figure 3:
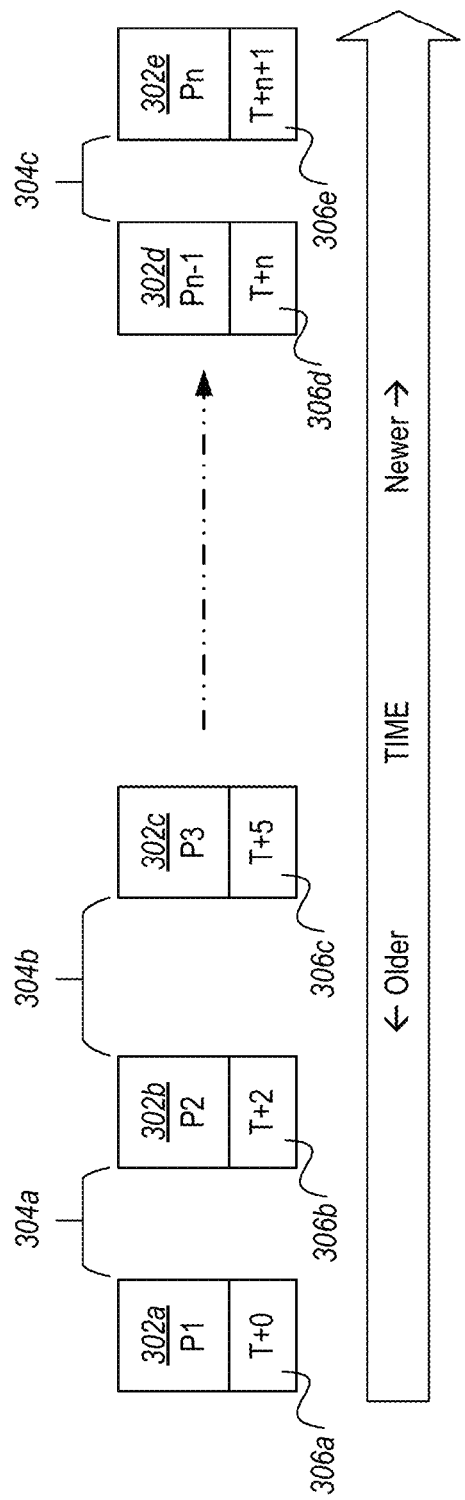
FIG. 3 illustrates the annotated time information and time relationship between packets to be processed through the apparatus of FIG. 1, according to various embodiments.

An example of this relationship is visually depicted in FIG. 3. A plurality packets 302a-302e (collectively, 302), corresponding to a first packet P1 to an arbitrary number Pn, are presented in a time sequence. Packet P1 is the first, and so oldest packet, increasing in number over time to packet Pn. Each packet is spaced from its successive packet by time intervals 304a-304c (collectively, 304). The spacing of each interval 304 varies, as may be seen in FIG. 3, with a shorter interval 304c indicating that packet 302e is transmitted relatively soon after packet 302d, and a longer interval 304b indicating that packet 302c is transmitted relatively later after packet 302b.

Each packet, in the depicted example, is annotated with time relationship information by network traffic scheduler 102, shown as time stamp 306a-306e (collectively, 306). Each time stamp 306 may be implemented as a data field or fields that can be inserted or appended to each packet 302. The time stamp can be any data useable to reflect a time difference between two successive packets 302. In one example, the time stamp may simply be the current system clock when the packet is dispatched to the network interface pipeline 106, such as where network traffic scheduler 102 holds or queues each packet prior to handing to the pipeline 106. In another example, the time stamp may be a counter that increments on a regular basis also commonly shared by jitter shaper 108. Subtracting the counter value of a previous packet from a current packet in this example yields a delta value that both scheduler 102 and jitter shaper 108 equate to a consistent length of time.

The example time stamps 306 in FIG. 3 start with a time of T+0 in time stamp 306a for packet 302a. Packet 302b has a time of T+2 in its time stamp 306b. Packet 302c has a time of T+5 in time stamp 306c. More generically, packet 302d, corresponding to a later packet Pn−1, has a time of T+n in time stamp 306d, with final packet 302e, packet Pn, having a time of T+n+1 in time stamp 306e. In each example, T may refer to an initial or base time, with a +n denoting a time count that is elapsed from the initial or base time T. Numerically, the additional numbers (+0, +2, +5) indicate some number of units of time that have elapsed since the initial time T. Thus, time interval 304a can be defined as the difference between time stamps 306a and 306b. In the example of FIG. 3, time interval 304a equates to 2 units, obtained by subtracting time stamp 306b of T+2 from time stamp 306a of T+0. Similarly, time interval 304b equates to 3 units, obtained by subtracting time stamp 306c, T+5, from time stamp 306b, T+2. In each case, a single unit may equate to some predetermined time interval that is commonly understood by network traffic scheduler 102 and jitter shaper 108, viz. both scheduler 102 and jitter shaper 108 will understand a single unit to be an identical measure of time.

As discussed above, the initial time T is not required in some implementations. In such embodiments, time stamp 306a may simply start with a count of 0, time stamp 306b may have a count of 2, and time stamp 306c may have a count of 5. Generically, a first time stamp may have a count of n, such as time stamp 306d, with its immediate successor having a count of n plus an additional amount reflecting the time relationship established by network traffic scheduler 102. In still another example, network traffic scheduler 102 may simply tag each packet 302 with its time offset from its immediate predecessor. With reference to FIG. 3, time stamp 306a in such an example may be tagged with 0 (or some arbitrary flag), as packet 302a does not have a predecessor; packet 302a may be the initial packet to be sent after a relatively long break, as will be discussed further herein. Continuing with the successive packets, time stamp 306b is tagged with 2, and time stamp 306c would be tagged with 3 (5−2). Thus, in such an example, the time stamp 306 of each packet 302 effectively equals the time interval 304 from its immediate predecessor.

It should be understood that the integer numbers used in FIG. 3 are merely for illustration, and the actual values and configurations of each time stamp 306 may vary for a given implementation. Moreover, for various embodiments it is not necessary that an actual or absolute time be annotated to each packet, as the time difference between any two temporally adjacent packets is all that jitter shaper 108 needs to reconstruct network traffic scheduler 102's intended time relationship. Thus, other possible implementations may be employed that convey the scheduler 102's intended time relationship between successive packets to jitter shaper 108.

Referring back to the example method 200 in FIG. 2, following annotation of each packet with time relationship information in operation 202, in operation 204, each packet may be processed through network interface hardware, such as network interface pipeline 106 in some embodiments. As discussed above, this processing may skew or jitter the time relationship between packets established by network traffic scheduler 102. As a result, packets 302, such as those emerging from end 110 of the pipeline 106, may be delayed to varying degrees beyond the time relationships established by scheduler 102.

Using packets processed through network interface pipeline 106 as one possible example, packet 302a may emerge at a time T+1 from pipeline 106, rather than T+0 for time stamp 306a, indicating that it took one time count to be processed. Packet 302b may emerge at a time T+5, compared to time stamp 306b at T+2, an increase of three counts over the original time stamp 306b, and a delay of two counts over the intended time interval 304a of two counts, such as may be established by network traffic scheduler 102. Continuing on, packet 302c, which may be smaller and so be processed faster, may emerge at a time T+6, only one count after packet 302b. If packets 302a-302c are transmitted as they emerge, packet 302b will be transmitted four counts after packet 302a, an increase of two counts over time interval 304a, with packet 302c being transmitted only one count after packet 302b, a decrease of two counts over time interval 304b, originally established as an interval of three counts. As a result, packets 302b and 302c will be transmitted in a burst, as opposed to the original spacing, which may have been set to avoid a burst that would violate downstream bandwidth limitations.

In embodiments, transmissions of packets 302 may be delayed as necessary, e.g. by jitter shaper 108, to ensure that packets 302 are sent with at least the approximate spacing established to comply with downstream bandwidth limits, but without imposing undue additional delays that would act to reduce network throughput. As will be explained below, in various embodiments packet transmissions may be shaped by adding some amount of delay, typically variable, to each packet 302 to account for processing delays and restore the packet time relationships to approximate the relationships established by scheduler 102. The extent to which packets may be delayed can also impact on the amount of resources required to manage jitter, such as resources that jitter shaper 108, in some embodiments, must have to buffer delayed packets.

Following processing, the packets proceed to jitter shaping; in the depicted embodiment, jitter shaper 108 receives the packets (which may not require actual data transfer, so long as jitter shaper 108 is made aware that each packet has completed processing and is ready for transmission). In operation 206, the packet time spacing is set according to the time relationship information annotated to each packet 302, as well as allowable error tolerance. Allowable error tolerance may include some measure of time variance from the initially established time relationships, with acceptable variance depending upon downstream bandwidth limitations. Allowable error tolerance may also encompass timing variations resulting from methods 420, 440, 450, and/or 460, as will be described herein with respect to FIGS. 4A-4E. In some embodiments, time spacing may be reestablished by delaying transfer of each packet to a transmission module (e.g. MAC layer or physical layer in some examples), or by signaling or cueing the transmission module, such as by jitter shaper 108, when to release each successive packet, depending upon the specifics of a given implementation of apparatus 100.

A number of different approaches to reestablishing the time spacing according to the time relationship information may be employed, depending upon the needs of a given implementation. For example, in embodiments where jitter shaper 108 reestablishes the time spacing, buffer resources available to jitter shaper 108 as well as target or optimal network throughput may determine the approach employed by jitter shaper 108. In some embodiments, the spacing initially established during scheduling, e.g. by network traffic scheduler 102, may be altered to optimize throughput in light of delays imposed by processing. In some other possible approaches, initial annotation of packets may be varied in consideration of how subsequent jitter shaping will reestablish the time spacing of packets 302.

In one possible embodiment, a relatively small data field is used for time stamp 306, such as a counter configured to roll over once it reaches a maximum count. This roll over may be accounted for during jitter shaping, such as by jitter shaper 108 in embodiments, by subtracting a time stamp from a subsequent rolled-over time stamp, which will result in a negative value, indicating a roll over condition. For example, if a counter is three digits, after reaching 999, the counter will roll back to 000 at the next count. A packet with a time stamp of 998 followed by a subsequent packet with a time stamp of 002 would result in a delta of negative 996. This negative condition can be relatively easily detected. Adding the delta to the counter range of 1000 (000-999 resulting in 1000 possible counts), will provide the actual delta of 4 for releasing the subsequent packet. Alternately, in embodiments where each time stamp 306 is the delta reflecting the time interval 304, as described above, this arithmetic can be performed during initial scheduling, such as by network traffic scheduler 102, and can be tagged to the subsequent packet 302 as a "4", hiding the roll-over from any subsequent jitter shaping process.

As a possible variation, packet flow can be monitored, such as by jitter shaper 108 or network traffic scheduler 102. Where there is a pause in traffic during which the time counter will otherwise roll over, the counter can be preemptively flagged or reset to zero upon receiving a new packet, resulting in the initial packet being immediately transmitted. In one possible embodiments employing scheduler 102 and jitter shaper 108, where jitter shaper 108 is aware of the counter status (such as where scheduler 102 and jitter shaper 108 share a counter or have synchronized counters), jitter shaper 108 can be configured to ignore a rolled over time stamp or delta when there has been a sufficient pause in traffic, and immediately transmit the first packet, with subsequent packets transmitted according to the annotated time relationship information. Whether a pause in traffic is sufficient to allow immediate transmission will depend upon the specifics of any downstream limitations, such as whether the pause has been long enough that it can be a priori determined that immediate transmission will not run afoul of any burst tolerance or other bandwidth limits. This can be ascertained, in some embodiments, by the network feedback 112 that informs the setting of time relationship information; in other embodiments, packets 302 may simply be annotated with a delay of zero if network feedback indicates that packets may be immediately transmitted.

FIGS. 4A to 4E are flowcharts of various example methods that may be implemented in whole or in part by apparatus 100. In various embodiments, one or more operations may be carried out by the previously discussed jitter shaper 108 and/or network traffic scheduler 102. These various methods provide different throughput optimizations in jitter shaping that may depart from normal scheduling of network traffic, such as scheduling performed by network traffic scheduler 102.

Figure 4A:
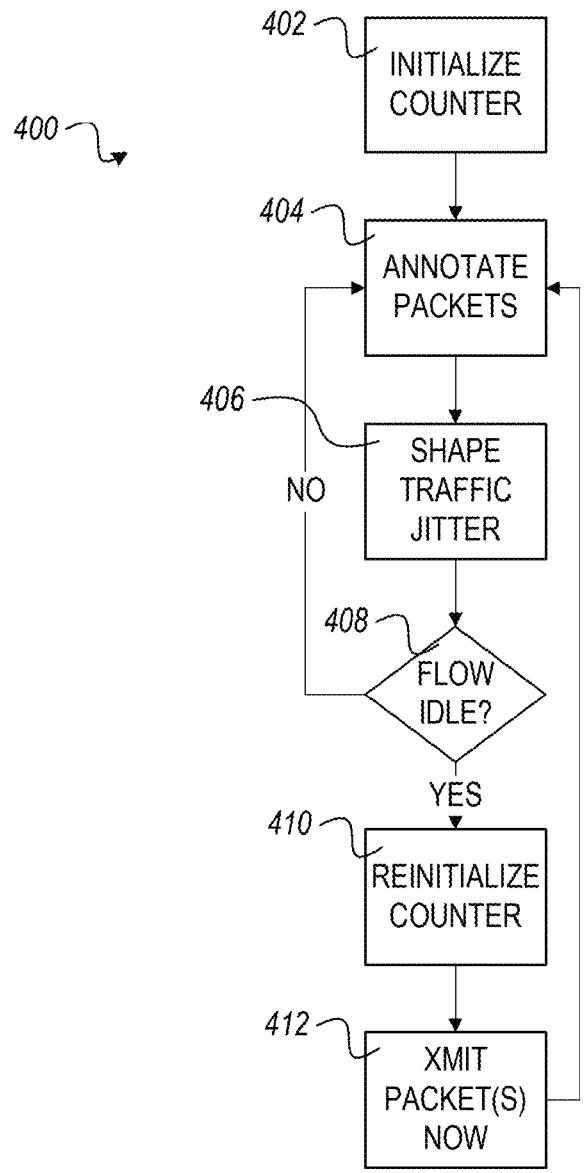
FIG. 4A is a flowchart of an example method for annotating packets and shaping jitter that may be executed in conjunction with the method of FIG. 2, according to various embodiments.

FIG. 4A illustrates the operations of an example method 400 that may be carried out with a time stamp counter that can be reinitialized, such as those described above with respect to a time counter that can roll over. One or more operations may, in various embodiments, be carried out by either network scheduler 102 or jitter shaper 108. In operation 402, the time counter is initialized to zero or another appropriate starting value. Some variations may employ a clock as a time reference. In embodiments employing scheduler 102 and jitter shaper 108, if jitter shaper 108 also includes a counter, it may be initialized to the same value as the network traffic scheduler 102's counter, or otherwise synchronized with the scheduler 102's counter.

Following initialization, in operation 404 a first packet is annotated with either the current time, or with an indication of zero delay for transmission; subsequent packets may be annotated with delay relative to the immediately preceding packet, as discussed above.

In operation 406, packets are received from processing, such as from end 110 of the network interface pipeline 106. Each packet 302 is then inspected by comparing the time stamp 306 annotated to packet 302 with the time stamp from the immediately previous packet to determine the intended time interval 304. The actual time interval between the immediately previous packet and current packet 302 is further determined, as marked by the actual time each packet 302 emerges from processing, and then compared against the intended time interval 304 to determine the amount of time jitter. As discussed above, if the actual time interval is shorter than the intended time interval 304, the subsequent packet 302 is delayed a length of time necessary to ensure that packet 302 is transmitted after the preceding packet at least the intended time interval 304.

However, continual delaying can reduce network throughput and, as packet flow changes, may not be necessary where a sufficiently long earlier delay introduces some headroom in downstream burst tolerance and/or bandwidth. As a result, if a sufficient amount of time passes between transmission of network packets (for example, if no new traffic is received for a predetermined period of time from scheduler 102 which is destined to the same output port and priority), then subsequent packets may be safely transmitted ahead of any time interval 304. In operation 408, packet flow is monitored (such as by jitter shaper 108 and/or network traffic shaper 102, in some embodiments) and, if idle for an appropriate amount of time (determined, as discussed above, with respect to downstream bandwidth limits), the time stamp counter in operation 410 is reinitialized. As seen in FIG. 4A, method 400 proceeds to operation 410 if the result of operation 408 is "YES".

As discussed above, packets 302 can be immediately transmitted in the event of an idle flow, such as by jitter shaper 108, as described above. Alternatively, packets can be annotated with a zero or small time interval 304, such as by network traffic scheduler 102, in the event of an idle flow. In embodiments employing a scheduler 102 and jitter shaper 108, it will be understood that jitter shaper 108 may be better suited to immediately release packets when the idle flow is due to a stall or substantial processing delay in network interface pipeline 106, such that scheduler 102 cannot anticipate the delay.

With a sufficient delay, in operation 412 one or more packets may be transmitted immediately, without respect to or otherwise shorter than any initially established time interval 304. Following operation 412 (if the response in operation 408 was "YES"), or if the response in operation 408 is "NO", method 400 iterates back to operation 404, where packets continue to be annotated in the normal fashion. The number of packets that can be immediately transmitted may be configured with respect to downstream bandwidth limitations and/or using internal or network feedback 112.

Figure 4B:
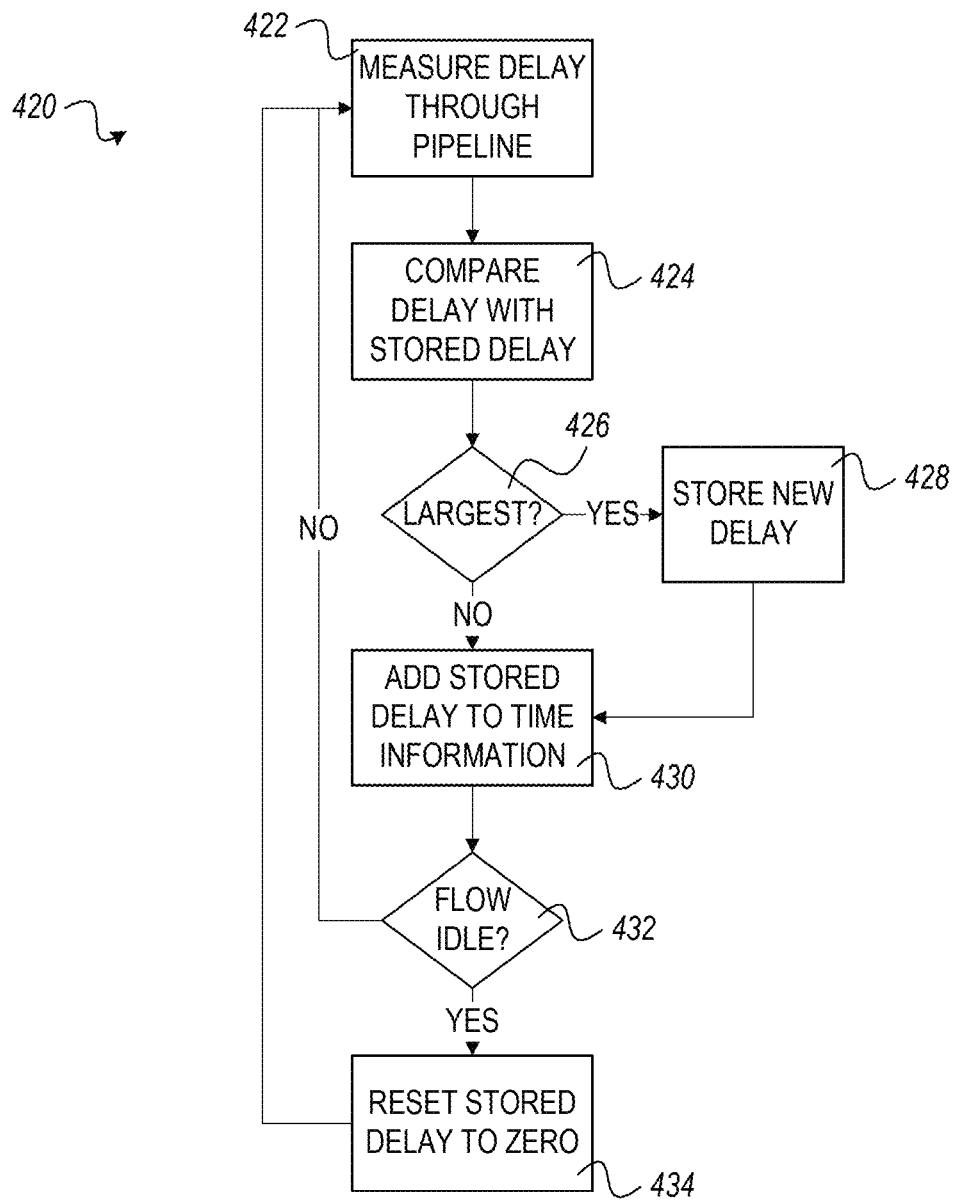
FIG. 4B is a flowchart of a first example method for modifying the delay imposed upon packets processed through the apparatus of FIG. 1, according to various embodiments.

In FIG. 4B, the operations for an example method 420 are depicted. In some embodiments, the operations may be performed in whole or in part by jitter shaper 108. Starting in operation 422, the processing delay for each packet 302 is measured. The amount of delay that any given packet 302 has encountered can be calculated by comparing the associated time stamp 306 with a current clock time following processing. In embodiments where operation 422 is performed by jitter shaper 108, this clock may be local to jitter shaper 108, assuming the clock used by scheduler 102 and the clock used by jitter shaper 108 are configured to count time at the same or virtually the same rate. In some embodiments, method 420 may be performed in whole or in part by jitter shaper 108 as part of carrying out operation 206 of method 200.

Following measuring of the pipeline delay, in operation 424 the delay is compared with a previously stored pipeline delay. If no delay is stored, the method jumps directly to operation 428 where the measured delay is stored, then the remaining operations for method 420 are carried out. Following the comparison in operation 424, in operation 426 if the measured delay is greater than the stored delay, operation 428 is carried out, where the currently stored delay is replaced with the new measured delay.

If the result of the comparison in operation 426 is no, where the measured delay is equal or smaller than the stored delay, or following operation 428, in operation 430 the stored delay amount is added to time interval 304 to delay packet 302 relative to its immediate predecessor.

In operation 432, packet flow is monitored for becoming idle. If the flow is idle for a predetermined amount of time (as determined based upon configured or inferred downstream bandwidth limitations), a "yes" result to operation 432, then method 420 proceeds to block 434, where the stored delay is either deleted or otherwise reset to zero. Following operation 434 or a "no" result to operation 432, method 420 may iterate back to operation 422 for subsequent packets, as part of operation 206. Thus, as will be appreciated by a person skilled in the art, method 420 effectively ripples the largest seen pipeline delay since the most recent idle flow period to all subsequent packets 302. Once the flow is sufficiently idle to clear out any downstream congestion, the delay is reset.

Figure 4C:
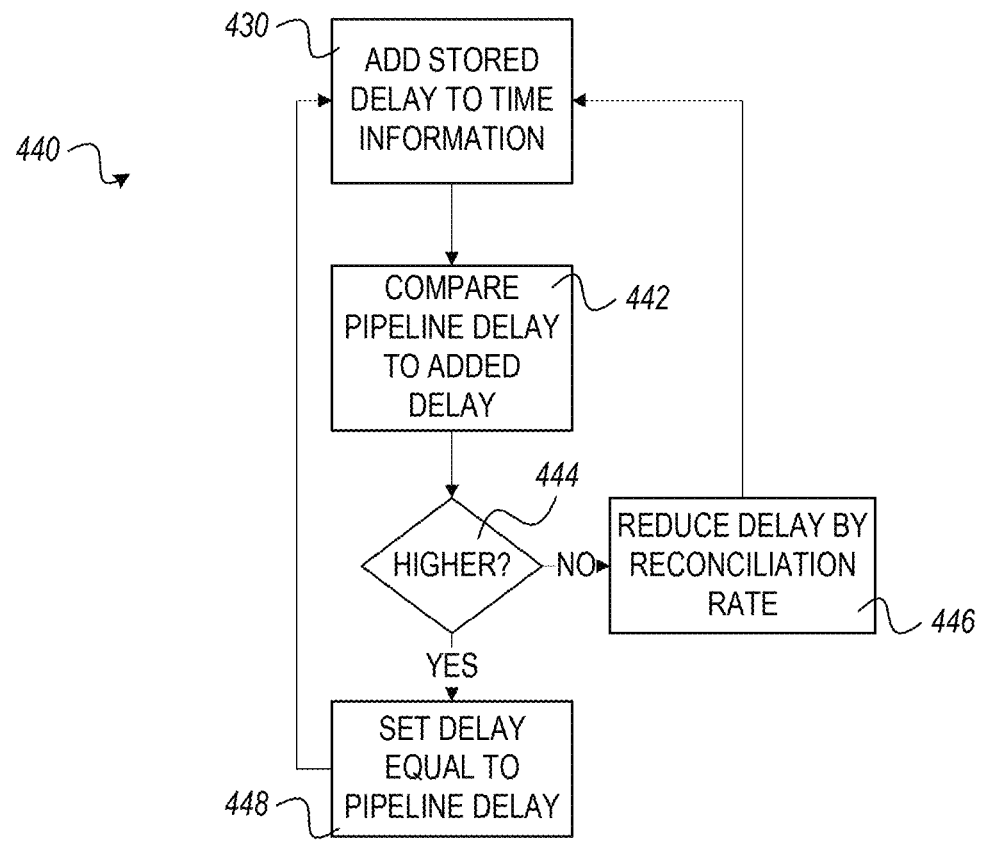
FIG. 4C is a flowchart of a second example method for modifying packet delay that may be used as part of the method of FIG. 4B, according to various embodiments.

FIG. 4C is a flowchart of operations for an example method 440. In some embodiments, method 440 may be carried out in whole or in part by apparatus 100, and in particular by jitter shaper 108, as a part of operation 430 from method 420. Following operation 430 (described above with respect to FIG. 4B), in operation 442 the pipeline delay, measured in operation 422 of method 420, is compared to the delay added to a given packet 302, which, per method 420, is equal to the delay stored in operation 428. If, in operation 444, the pipeline delay is lower than the delay added in operation 430 (the "no" branch), then the added delay is reduced by a predetermined reconciliation rate in 446. As with other parameters in the disclosed methods, the reconciliation rate may be determined with respect to particular bandwidth limitations, to ensure that a reduction of delay by the reconciliation rate does not result in a bandwidth violation and potentially dropped packets.

If, however, the result of operation 444 is "yes"—the pipeline delay is greater than the added delay—then in operation 448 the delay is set equal to the pipeline delay. These operations compare to operation 424 and 428 of method 420, where a measured pipeline delay is greater than the stored delay, and so becomes the new stored delay in operation 428. As will be understood, method 440 may be used in conjunction with method 420, with the stored delay also being reduced by the predetermined reconciliation rate until encountering a measure pipeline delay greater than the stored delay (operation 444 results in a yes). Following either operation 446 or operation 448, method 440 iterates back to operation 430.

Method 440, in the example embodiment, assumes that over time any downstream policer would gradually reduce its associated policing bucket fill level or other burstiness or bandwidth monitor, so it is safe to gradually allow some additional bursts of packets 302 if an exceptionally large amount of jitter has not been seen in the recent past. In some embodiments, one way of doing this is to allow the rate at which jitter shaper 108's internal clock ticks (if so equipped) update the local time stamp to be configured to be slightly faster than the rate at which network traffic scheduler 102 updates its time stamp annotations, bounding the minimum interval between received and local time stamp to a configurable threshold. As will be understood, the threshold is configurable based upon the specific bandwidth limitations imposed by any downstream policer.

Figure 4D:
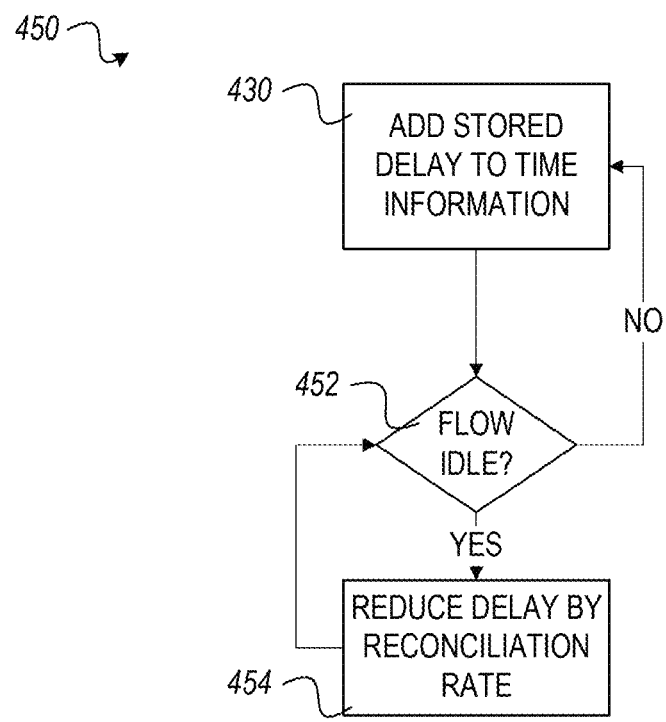
FIG. 4D is a flowchart of a third example method for modifying the delay imposed upon packets that may be used as part of the methods of FIGS. 4A and 4B, according to various embodiments.

FIG. 4D depicts the operations of a method 450. In some embodiments, method 450 may be executed in whole or in part by jitter shaper 108 as further operations associated with operation 430 of method 420. Following adding the stored delay to the time stamp 306 of a given packet 302 in operation 430, the packet flow is monitored for an idle state in operation 452. If the packet flow is not idle, method 450 iterates back to operation 430. Method 450 may be executed in addition to, or as an alternative to, method 440.

However, if the packet flow becomes idle (the "yes" branch), method 450 moves to operation 454, where the stored delay is reduced (per operation 428 of method 420) by the preconfigured reconciliation rate. Following operation 454, method 450 iterates back to operation 452. Thus, method 450 iteratively reduces the stored delay by the reconciliation rate as long as the packet flow is idle; once the packet flow resumes, the now-reduced stored delay is added to the time stamps 306 per operation 430.

It will be appreciated that method 450 is essentially a variation of operations 432 and 434 of method 420, where setting the delay to zero upon an idle flow, per operation 434 described above, is accomplished gradually using the preconfigured reconciliation rate. Reducing the added delay only when there are minimum configured sized idle periods guarantees that any downstream policer would have correspondingly reduced its associated policing bucket fill level or other burstiness/bandwidth (limiting) mechanism, allowing a faster reconciliation rate. In embodiments where jitter shaper 108 executes method 450, unless jitter shaper 108 has visibility into when the internal queue seen by network traffic scheduler 102 goes empty, method 450 requires the size of each packet 302 and the link speed to be considered in order to determine when the packet flow is expected to become idle. If neither queue fill state nor packet size information is available, it is possible to approximate idle time by assuming a maximum-sized packet was last sent.

Figure 4E:
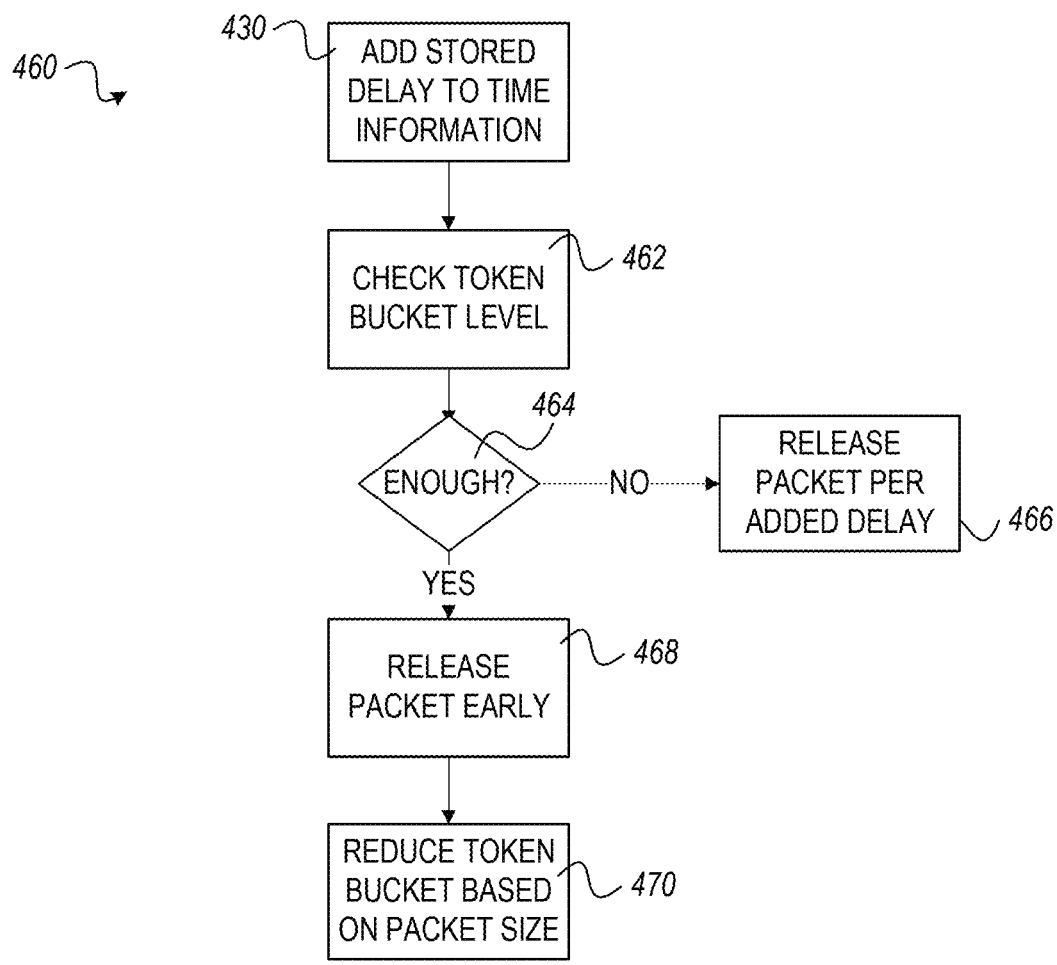
FIG. 4E is a flowchart of a fourth example method for modifying the delay imposed upon packets that may be used as a part of the method of FIG. 4B, according to various embodiments.

Finally, FIG. 4E depicts a further variation from operation 430, example method 460. In some embodiments, method 460 can be executed by jitter shaper 108 in whole or in part. Method 460 incorporates considerations of varying packet size into jitter shaping, as some downstream bandwidth limits may be based on overall data size, rather than a simple number of packets. Thus, method 460 is useful where the sizes of packets 320 are variable.

As with methods 440 and 450, method 460 begins at operation 430 of method 420. Following operation 430, in operation 462 a token bucket level is checked for a sufficient token level. In the disclosed embodiment, token level equates to the size of a given packet 302. Thus, larger packets 302 will require a greater token level, while smaller packets will require a lesser token level. If, in operation 464, it is determined that the level of tokens in the token bucket is sufficient to the size of the currently processed packet 302, then method 460 proceeds to operation 468. In operation 468, the packet is released for transmission early, possibly faster than the time interval 304 initially established during scheduling. Following operation 468, the token bucket is reduced by an amount corresponding to the size of released packet 302 in operation 470. However, if there is not a sufficient amount of tokens in the token bucket (the "no" branch of operation 464), then the packet is released in operation 466 per the delay originally set in operation 430.

The token bucket may be implemented as any suitable data structure in, associated with, or otherwise accessible to apparatus 100. In some embodiments, the token bucket may simply be a numeric field that can be incremented or decremented. The token bucket is "filled" during times of low or idle packet flow by incrementing the bucket based on a preconfigured rate. As will be understood, the preconfigured rate may depend upon downstream bandwidth limits. The token bucket may further be configured with a maximum fill amount, which is determined based upon downstream bandwidth limits, viz. the token bucket is capped at a maximum amount that will ensure that any burst permitted by a filled bucket will not violate downstream bandwidth limits.

By using a token bucket, varying numbers of packets 302 may be sent early, depending on packet size and token bucket fill. Method 460, by employing a size-based token bucket approach, recognizes that sending a small packet early will fill the bucket of a downstream policer much less than sending a large packet early. Likewise, sending multiple small packets early is comparable to sending a single larger packet early. The allocation of the total allowable burst tolerance is, in embodiments, controlled by the configured token refill rate during idle flow, token consumption rate (based on packet sizes), and maximum positive token saturation point (e.g. the bucket is filled). Thus, method 460 allows that only packets which exceed the configured burst tolerance (as indicated by the absence of sufficient tokens at the time the packet arrives) are delayed.

With reference back to example method 200 in FIG. 2, following resetting or modification of the time relationship between packets 302 in operation 206, each packet is prepared, copied, or otherwise signaled to be transmitted over the network, e.g. by jitter shaper 108. Depending upon the specifics of a given implementation, transmission for each packet 302 is initiated per the corrected time relationship, determined as described above with reference to operation 206 and FIGS. 4A-4E. In some possible implementations, jitter shaper 108 handles initiating transmission for each packet 302 individually. In other possible implementations, jitter shaper 108 may update the time stamp 306 in each packet 302 or otherwise annotate each packet 302 with its correct transmission time, and dispatch the packets to a transmission handler (not depicted; it may be part of a lower level of apparatus 100) to transmit the packets per the annotated or updated transmission time. Still other implementations may employ other suitable mechanisms to transmit each packet 302 per the jitter-shaped time relationships.

Some embodiments of apparatus 100 and/or method 200 may be implemented in systems having multiple channels or ports (logical or physical) for transmission of data. Each channel or port may be subject to differing downstream limitations, with some channels or ports possibly not being subject to limitations. Method 200 (and associated methods 400, 420, 440, 450 and/or 460) may be individually and independently applied to each separate channel or port. Thus, for ports with no limitations, no jitter shaping may be needed, while other ports may employ different jitter shaping strategies appropriate to each channel's unique bandwidth limitations. In some embodiments, a single network traffic scheduler 102 may feed multiple network interfaces, with multiple network interface pipelines 106, each having a separate jitter shaper 108.

Figure 5:
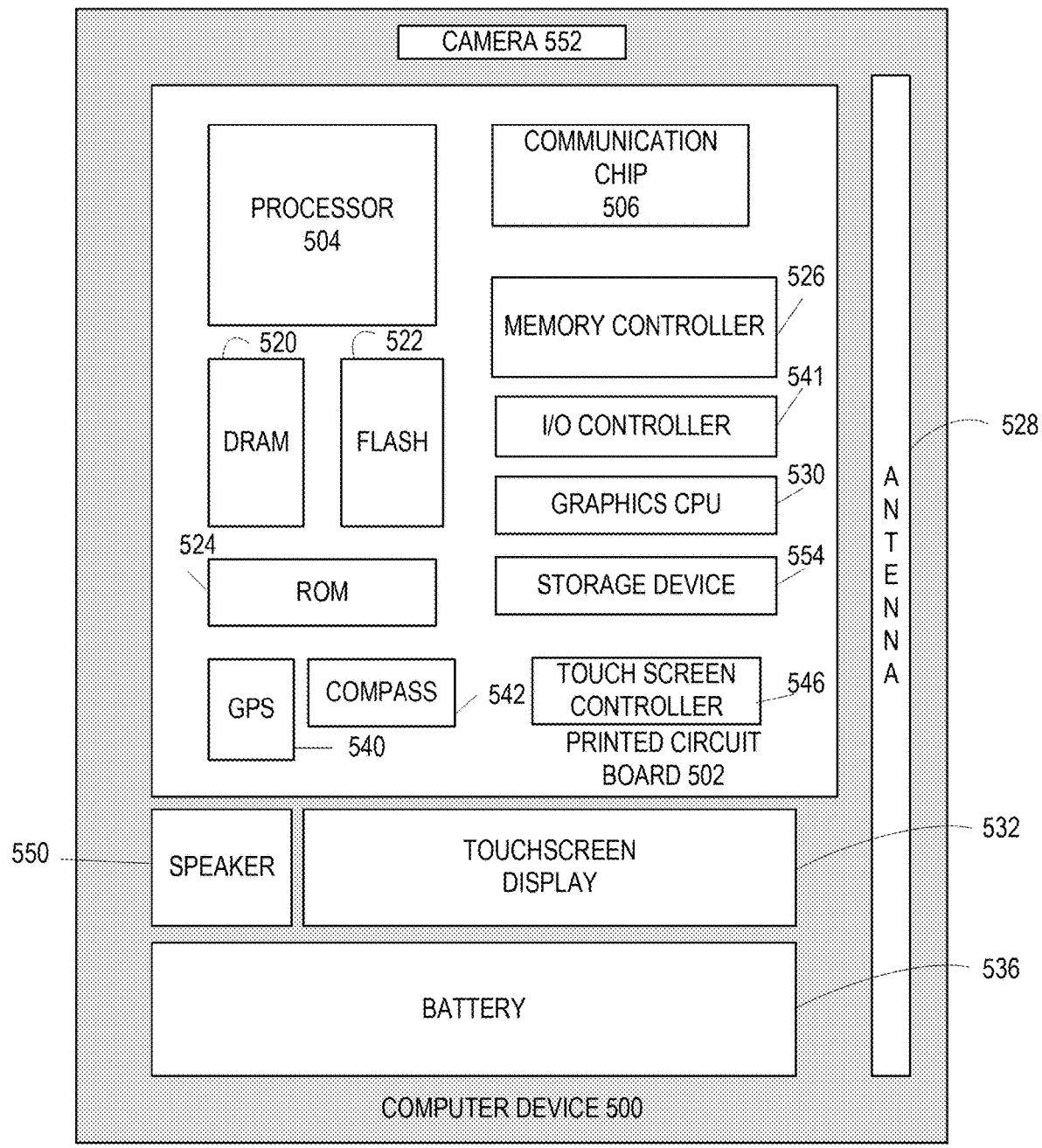
FIG. 5 is a block diagram of an example computer that can be used to implement some or all of the components of the system or methods disclosed herein, according to various embodiments.

FIG. 5 illustrates an example computer device 500 that may employ the apparatuses and/or methods described herein (e.g., network traffic scheduler 102 and/or jitter shaper 108 of apparatus 100), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, one or more of the at least one communication chip 506 may include the network traffic shaping technology of the present disclosure, described earlier with references to FIGS. 1-4. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502 such as via integration into one or more communicatively coupled multi-die System in Package chips.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to implement an operating system and/or one or more applications. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wired or wireless standards or protocols, including but not limited to IEEE 802.3, 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others. Communications chips 506 may be used to implement various components of apparatus 100, such as various modules or nodes of network interface pipeline 106, as well as the MAC and/or physical layers that interface with jitter shaper 108.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a communication component of a device, e.g., communication chip 506 of computer 500, in response to execution of the programming instructions, to implement (aspects of) network traffic scheduler 102 and/or jitter shaper 108 of apparatus 100. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is an apparatus for networking, comprising a network traffic scheduler communicatively coupled to a start of a network interface pipeline; and a jitter shaper communicatively coupled to an end of the network interface pipeline, wherein the network traffic scheduler is to annotate each of a plurality of network packets to be processed through the network interface pipeline with time relationship information, the time relationship information calculated with respect to network bandwidth limitations, and the jitter shaper is to set a time spacing of the plurality of network packets for transmission according to the time relationship information.

Example 2 includes the subject matter of example 1, or some other example herein, wherein to annotate each of a plurality of network packets to be processed through the network interface pipeline with time relationship information, the network traffic scheduler is arranged to annotate each of the plurality of network packets with a time stamp.

Example 3 includes the subject matter of example 2, or some other example herein, wherein the network traffic scheduler is to reset the time stamp to an initial state after an idle period of at least a predetermined length, of no network traffic, and prior to the time stamp rolling over.

Example 4 includes the subject matter of any of examples 1-3, or some other example herein, wherein the jitter shaper is further to cause the plurality of network packets to be transmitted according to the set time spacing.

Example 5 includes the subject matter of any of examples 1-4, or some other example herein, wherein the network traffic scheduler is arranged to determine the time relationship information with respect to one or more of scheduler/shaper hierarchy node rate shaping, burst tolerance policies, internal buffer and/or network congestion feedback.

Example 6 includes the subject matter of any of examples 1-5, or some other example herein, wherein the network traffic scheduler is to annotate each of the plurality of network packets with a timestamp placed into a packet metadata associated with each of the plurality of network packets.

Example 7 includes the subject matter of any of examples 1-6, or some other example herein, wherein the jitter shaper is to further set the time spacing of the plurality of network packets with respect to allowable error tolerance information.

Example 8 includes the subject matter of any of examples 1-7, or some other example herein, wherein the jitter shaper is to further set the time spacing of the plurality of network packets by adding a delay equal to a longest delay time of the plurality of network packets processed through the network interface pipeline seen by the jitter shaper since the most recent idle period.

Example 9 includes the subject matter of example 8, or some other example herein, wherein the jitter shaper is to further set the time spacing of the plurality of network packets by gradually reducing the delay based on a predetermined reconciliation rate until receiving a network packet with time relationship information that requires a greater delay than the amount of delay to be added.

Example 10 includes the subject matter of example 8, or some other example herein, wherein the jitter shaper is to further set the time spacing of the plurality of network packets by gradually reducing the delay based on a predetermined reconciliation rate during idle periods of at least a predetermined length, of no network traffic.

Example 11 includes the subject matter of any of examples 1-10, or some other example herein, wherein the jitter shaper further comprises a token bucket, and wherein one or more tokens are added to the bucket during idle periods of at least a predetermined length, of no network traffic, and the jitter shaper is to release a packet of the plurality of network packets in advance of its time spacing when there are sufficient tokens in the bucket, as determined based on the size of the packet.

Example 12 includes the subject matter of example 11, or some other example herein, wherein the jitter shaper is to ad one or more tokens to the bucket at a refill rate determined with respect to the network bandwidth limitations.

Example 13 includes the subject matter of any of examples 1-12, or some other example herein, wherein the apparatus is a network interface device for transmitting packets over a network.

Example 14 is a method for reducing jitter in network packets by a network interface, comprising receiving a plurality of network packets for transmission; annotating each of the plurality of network packets with time relationship information, the time relationship information calculated with respect to network bandwidth limitations; and processing each of the plurality of network packets through a network interface pipeline, taking into consideration the annotated time relationship information.

Example 15 includes the subject matter of example 14, or some other example herein, further comprising setting a time spacing of each of the plurality of network packets according to the time relationship information; and transmitting each of the network packets according to the time spacing.

Example 16 includes the subject matter of example 14 or 15, or some other example herein, further comprising adding a delay to each packet of the plurality of network packets equal to a longest delay time of the plurality of network packets processed through the network interface pipeline since the most recent idle period.

Example 17 includes the subject matter of any of examples 14-16, or some other example herein, further comprising filling a token bucket with one or more tokens during idle periods of a minimum predetermined length when no network packets are present; and transmitting a network packet in advance of its time spacing when the token bucket includes a sufficient number tokens, determined by the size of the network packet.

Example 18 includes the subject matter of example 17, or some other example herein, wherein filling the token bucket comprises filling the token bucket with one or more tokens at a predetermined rate based upon the network bandwidth limitations.

Example 19 includes the subject matter of example 18, or some other example herein, further comprising discontinuing filling the token bucket when the number of tokens in the token bucket reaches a predetermined threshold, the predetermined threshold based upon the network bandwidth limitations.

Example 20 is a non-transitory computer readable medium (CRM) comprising instructions that, when executed by a network interface device, cause the device to receive each of a plurality of network packets annotated with time relationship information prior to processing through a network interface pipeline, the time relationship information calculated with respect to network bandwidth limitations; and set a time spacing of each of the plurality of network packets according to the time relationship information following processing through the network interface pipeline; wherein the time relationship information is determined by one or more of scheduler/shaper hierarchy node rate shaping, burst tolerance policies, network bandwidth limitations, internal feedback and/or network congestion feedback.

Example 21 includes the subject matter of example 20, or some other example herein, wherein the instructions are to further cause the device to add a delay to each packet of the plurality of network packets equal to a longest delay time of the plurality of network packets processed through the network interface pipeline during a most recent idle period.

Example 22 includes the subject matter of example 20 or 21, or some other example herein, wherein the instructions are to further cause the device to fill a token bucket with one or more tokens during idle periods of a minimum predetermined length when no network packets are present; transmit a network packet in advance of its time spacing when the token bucket includes a sufficient number tokens, determined by the size of the network packet, and reduce the number of tokens in the token bucket by a number determined by the size of the network packet.

Example 23 is an apparatus to reduce network traffic jitter, comprising a means for scheduling network traffic, the network traffic comprised of a plurality of network packets; a means for processing network packets with an input and an output, the input communicatively coupled to the scheduling means, to receive one or more of the plurality of network packets from the scheduling means; and a means for shaping network traffic jitter communicatively coupled to the output, to receive one or more of the plurality of network packets from the packet processing means, wherein the scheduling means is to annotate each of a plurality of network packets to be processed through the network interface pipeline with time relationship information, the time relationship information calculated with respect to network bandwidth limitations, and the shaping means is to set a time spacing of the plurality of network packets for transmission according to the time relationship information.

Example 24 includes the subject matter of example 23, or some other example herein, wherein the shaping means further comprises a token bucket, and wherein one or more tokens are added to the bucket during idle periods of at least a predetermined length, of no network traffic, and the shaping means is to release a packet of the plurality of network packets in advance of its time spacing when there are sufficient tokens in the bucket, as determined based on the size of the packet.

Example 25 includes the subject matter of example 24, or some other example herein, wherein the shaping means is to add one or more tokens to the bucket at a refill rate determined with respect to the network bandwidth limitations.

Example 26 is an apparatus for networking, comprising a network traffic scheduler communicatively coupled to a start of a network interface pipeline; and a jitter shaper communicatively coupled to an end of the network interface pipeline, wherein the network traffic scheduler is to annotate each of a plurality of network packets to be processed through the network interface pipeline with time relationship information, the time relationship information calculated with respect to network bandwidth limitations.

Example 27 includes the subject matter of example 26, or some other example herein, wherein the jitter shaper is to set a time spacing of the plurality of network packets for transmission according to the time relationship information.

Example 28 is a non-transitory computer readable medium (CRM) comprising instructions that, when executed by a network interface device, cause the device to receive each of a plurality of network packets following processing through a network interface pipeline, each of the plurality of network packets having been annotated with time relationship information prior to processing, the time relationship information calculated with respect to network bandwidth limitations; and set a time spacing of each of the plurality of network packets according to the time relationship information; wherein the time relationship information is determined by one or more of scheduler/shaper hierarchy node rate shaping, burst tolerance policies, network bandwidth limitations, internal feedback and/or network congestion feedback.

What is claimed is:
1. An apparatus for networking, comprising:
a network traffic scheduler communicatively coupled to a start of a network interface pipeline; and a jitter shaper communicatively coupled to an end of the network interface pipeline,
wherein the network traffic scheduler is to annotate each of a plurality of network packets to be processed through the network interface pipeline with time relationship information, the time relationship information calculated with respect to network bandwidth limitations, and
the jitter shaper is to set a time spacing of the plurality of network packets by adding a delay based on delay times of the plurality of network packets processed through the network interface pipeline seen by the jitter shaper since a most recent idle period, and gradually reduce the delay based on a reconciliation rate.

2. The apparatus of claim 1, wherein to annotate each of a plurality of network packets to be processed through the network interface pipeline with time relationship information, the network traffic scheduler is arranged to annotate each of the plurality of network packets with a time stamp.

3. The apparatus of claim 2, wherein the network traffic scheduler is to reset the time stamp to an initial state after an idle period of at least a predetermined length of no network traffic, and prior to the time stamp rolling over.

4. The apparatus of claim 1, wherein the jitter shaper is further to cause the plurality of network packets to be transmitted according to the set time spacing.

5. The apparatus of claim 1, wherein the network traffic scheduler is arranged to determine the time relationship information with respect to one or more of hierarchical node rate shaping, burst tolerance policies, internal buffer or network congestion feedback.

6. The apparatus of claim 1, wherein the network traffic scheduler is to annotate each of the plurality of network packets with a timestamp placed into a packet metadata associated with each of the plurality of network packets.

7. The apparatus of claim 1, wherein the jitter shaper is to further set the time spacing of the plurality of network packets with respect to allowable error tolerance information.

8. The apparatus of claim 1, wherein the jitter shaper is to further gradually reduce the delay based on the reconciliation rate until receiving a network packet with time relationship information that requires a greater delay than the delay to be added.

9. The apparatus of claim 1, wherein the jitter shaper is to further gradually reduce the delay based on the reconciliation rate during idle periods of at least a predetermined length of no network traffic.

10. The apparatus of claim 9, wherein the jitter shaper further comprises a token bucket, and wherein:
one or more tokens are added to the token bucket during idle periods of at least a predetermined length, of no network traffic, and
the jitter shaper is to release a packet of the plurality of network packets in advance of the time spacing of the plurality of network packets when there are sufficient tokens in the token bucket, as determined based on a size of the packet.

11. The apparatus of claim 10, wherein the jitter shaper is to add one or more tokens to the token bucket at a refill rate determined with respect to the network bandwidth limitations.

12. The apparatus of claim 1, wherein the jitter shaper is to set the time spacing of the plurality of network packets for transmission according to the time relationship information.

13. A method for reducing jitter in network packets by a network interface, comprising:

receiving a plurality of network packets for transmission;
annotating each of the plurality of network packets with time relationship information, the time relationship information calculated with respect to network bandwidth limitations;
processing each of the plurality of network packets through a network interface pipeline, taking into consideration the annotated time relationship information;
filling a token bucket with one or more tokens during idle periods of a minimum predetermined length when no network packets are present; and
transmitting a network packet in advance of the packet's time spacing when the token bucket includes a sufficient number of tokens, determined by a size of the network packet.

14. The method of claim 13, further comprising:
setting a time spacing of each of the plurality of network packets according to the time relationship information; and
transmitting each of the network packets according to the time spacing.

15. The method of claim 13, further comprising adding a delay to each packet of the plurality of network packets based on a delay time of the plurality of network packets processed through the network interface pipeline since a most recent idle period.

16. The method of claim 13, wherein filling the token bucket comprises filling the token bucket with one or more tokens at a predetermined rate based upon the network bandwidth limitations.

17. The method of claim 16, further comprising discontinuing filling the token bucket when the number of tokens in the token bucket reaches a predetermined threshold, the predetermined threshold based upon the network bandwidth limitations.

18. A non-transitory computer readable medium (CRM) comprising instructions that, when executed by a processor in a network interface device, cause the device to:
receive each of a plurality of network packets following processing through a network interface pipeline, each network packet of the plurality of network packets is annotated with time relationship information prior to processing, the time relationship information calculated with respect to network bandwidth limitations;
set a time spacing of each of the plurality of network packets according to the time relationship information; and
add a delay to each of the plurality of network packets based on a delay time of the plurality of network packets processed through the network interface pipeline during a most recent idle period, and gradually reduce the delay based on a reconciliation rate;
wherein the time relationship information is determined by one or more of hierarchical node rate shaping, burst tolerance policies, network bandwidth limitations, internal feedback or network congestion feedback.

19. The CRM of claim 18, wherein the instructions are to further cause the network interface device to:
fill a token bucket with one or more tokens during idle periods of a minimum predetermined length when no network packets are present;
transmit a network packet in advance of its the packet's time spacing when the token bucket includes a sufficient number of tokens, determined by a size of the network packet, and
reduce the number of tokens in the token bucket by a number determined by the size of the network packet.

20. An apparatus to reduce network traffic jitter, comprising:
- a means for scheduling network traffic, the network traffic comprising a plurality of network packets;
- a means for processing network packets with an input and an output, the input communicatively coupled to the scheduling means, to receive one or more of the plurality of network packets from the scheduling means; and
- a means for shaping network traffic jitter communicatively coupled to the output, to receive one or more of the plurality of network packets from the packet processing means,
- wherein the scheduling means is to annotate each of the plurality of network packets to be processed through a network interface pipeline with time relationship information, the time relationship information calculated with respect to network bandwidth limitations, and
- the shaping means comprises a token bucket, and
- one or more tokens are added to the token bucket during idle periods of at least a predetermined length of no network traffic, and
- the shaping means is to release a packet of the plurality of network packets in advance of the packet's time spacing when there are sufficient tokens in the token bucket, as determined based on a size of the packet.

21. The apparatus of claim 20, wherein the shaping means is to add one or more tokens to the token bucket at a refill rate determined with respect to the network bandwidth limitations.

* * * * *